United States Patent
Kempf

(10) Patent No.: US 7,195,575 B2
(45) Date of Patent: Mar. 27, 2007

(54) SPLINED SUN GEAR AND METHOD FOR COMPACT ELECTRO-MECHANICAL TRANSMISSION

(75) Inventor: Gregory W. Kempf, Avon, IN (US)

(73) Assignees: General Motors Corporation, Detroit, MI (US); DaimlerChrysler Corporation, Auburn Hills, MI (US)

( * ) Notice: Subject to any disclaimer, the term of this patent is extended or adjusted under 35 U.S.C. 154(b) by 167 days.

(21) Appl. No.: 11/013,647

(22) Filed: Dec. 16, 2004

(65) Prior Publication Data

US 2005/0209037 A1 Sep. 22, 2005

Related U.S. Application Data

(60) Provisional application No. 60/555,141, filed on Mar. 22, 2004.

(51) Int. Cl.
*F16H 3/72* (2006.01)
(52) U.S. Cl. .......................................... 475/5; 475/149
(58) Field of Classification Search ................ 475/149, 475/5
See application file for complete search history.

(56) References Cited

U.S. PATENT DOCUMENTS

| | | | | |
|---|---|---|---|---|
| 5,931,757 A | * | 8/1999 | Schmidt ........................ 475/2 |
| 6,358,173 B1 | * | 3/2002 | Klemen et al. ................. 475/5 |
| 6,743,135 B2 | * | 6/2004 | Klemen et al. ................. 475/5 |
| 7,002,267 B2 | * | 2/2006 | Raszkowski et al. ......... 310/54 |
| 2005/0209038 A1 | * | 9/2005 | Kempf et al. ............... 475/159 |
| 2005/0209040 A1 | * | 9/2005 | Foster et al. ................ 475/159 |

\* cited by examiner

*Primary Examiner*—Dirk Wright
(74) *Attorney, Agent, or Firm*—Christopher DeVries

(57) ABSTRACT

This invention relates to a sun gear member and sun gear shaft providing improved manufacturing time and material cost savings. This invention further relates to the packaging of a compact electro-mechanical transmission specifically as it pertains to the redesign of the planetary gear arrangement to compensate for the new design of the sun gear member and sun gear shaft. Several design modifications are disclosed in order to reduce the diameter of the planetary gear arrangement and its inclusive members. For example, the ring gear is chamfered to allow for additional clearance so that the planetary gear arrangement and the electronic motor package can be more compact when sun gear has separable sun gear members. In addition to packaging considerations, material costs, fatigue life requirements, and manufacturability of relevant transmission components were governing concerns in the redesign of the sun gear member and sun gear shaft.

10 Claims, 2 Drawing Sheets

SPLINED SUN GEAR AND METHOD FOR COMPACT ELECTRO-MECHANICAL TRANSMISSION

CROSS-REFERENCE TO RELATED APPLICATIONS

This application claims the benefit of U.S. Provisional Application 60/555,141 filed Mar. 22, 2004.

TECHNICAL FIELD

This invention relates to a hybrid electro-mechanical transmission having planetary gear arrangements with sun gears.

BACKGROUND OF THE INVENTION

Passenger vehicles include a powertrain that is comprised of an engine, multi-speed transmission, and a differential or final drive train. The multi-speed transmission increases the overall operating range of the vehicle by permitting the engine to operate through its torque range a number of times. Automatic multi-speed transmissions improve the operating performance and fuel economy of the vehicle.

The benefits of three and four speed automatic-shifting transmissions have caused their popularity among the motoring public to significantly increase over the last few decades. Moreover, the demand for having vehicles equipped with an automatic transmission has not been curtailed by the demands for having vehicles with more fuel-efficient power sources. Users of hybrid (electro-mechanical) vehicles, for example, still desire vehicles equipped with an automatic transmission. However, the transmission-related packaging requirements for hybrid vehicles are more demanding than those for non-hybrids since hybrids require the use of at least one electric motor to supply power to the automatic transmission. The presence of the electric motor significantly reduces the amount of packaging space available for the transmission and its necessary components. Design demands, therefore, aim for fitting the electro-mechanical transmission within the smallest possible packaging space.

Integral to any automatic planetary transmission is at least one planetary gear arrangement consisting of a sun gear, planetary carrier with pinion gears, and a ring gear. Most automatic transmissions have multiple planetary gear arrangements. Through clutches, the ring gear, the sun gear and planetary pinion gears are capable of outputting several gear ratios. The three types of gears can mesh to produce a reduction: where the output speed is slower than the input speed; or an overdrive: where the output speed is faster than the input speed. For example, holding the ring gear stationary while the sun gear engages with the planetary carrier produces a reduction. However, if the sun gear is held stationary while the ring and planetary pinion gears mesh an overdrive is the output. Finally, if the driver wants to reverse the vehicle, the planetary pinion gears can be held stationary to support the gear reduction while the direction of rotation is reversed. The gears in the arrangement are typically helical—cut at an angle for progressive engagement—to provide a more smooth and quiet operation than spur gears.

The sun gear and sun gear shaft go through complex manufacturing processes to meet their respective design and fatigue life requirements. For example, the sun gear shaft must be designed with the appropriate size and material hardness to withstand at least 250,000 torque cycles at its maximum torque level. Moreover, the sun gear requires even more extensive material hardening to meet its pitting and bending fatigue strength requirements. If the sun gear and its shaft are integral, the heat treatment process required for the sun gear results in significant distortion of the sun gear shaft; post-heat-treatment straightening and machining are required to compensate. A more manufacturable—thus economical—design entails having the sun gear separable from the sun gear shaft during their respective manufacturing processes thereby simplifying their overall manufacturing process and reducing the need for post-heat-treatment straightening and machining. However, reconnecting the parts for operation requires a connecting mechanism, like splines, which can create the need for additional radial packaging space over that of an integral sun gear and sun gear shaft.

An electro-mechanical transmission is described and commonly assigned U.S. Ser. No. 10/946,915, Schmidt et al., filed Sep. 22, 2004, entitled "Two-Mode Compound-Split, Hybrid Electro-Mechanical Transmission Having Four Fixed Ratios," assigned to General Motors Corporation and hereby incorporated by reference in its entirety.

SUMMARY OF THE INVENTION

The present invention provides a compact electro-mechanical transmission with a sun gear and sun gear shaft having improved manufacturability. Several design modifications are disclosed, including reducing the diameter of the planetary gear arrangement and its inclusive members to compensate for the increased radial space required to achieve a splined connection between the sun gear and its shaft.

In one aspect of the present invention, the sun gear and sun gear shaft are axially separable. The sun gear and shaft can be attached by a number of methods known in the art. In the preferred embodiment, the sun gear and sun gear shaft are connected by complementary splines located on the sun gear and the sun gear shaft.

In another aspect of the present invention, the sun gear shaft contains a rim section that is radially adjacent to the splines. The rim section is designed to minimize the packaging space required for the planetary gear arrangement while meeting the sun gear shaft's respective fatigue life requirements.

In another aspect of the present invention, the sun gear shaft encircles the main shaft and the diameter of the main shaft is designed in such a way as to reduce the resulting packaging space required for the planetary gear arrangement while meeting the main shaft's fatigue life requirements.

In another aspect of the present invention, the ring gear member is chamfered to enable sufficient minimum clearance between the planetary gear arrangement and the electric motor package housed in the transmission so that the planetary gear arrangement can compactly nest with the electric motor and other transmission components. Though chamfering was used to accomplish a smaller packaging area for the planetary gear arrangement, other aspects of this invention include a variety of means to reduce the radial span of the planetary gear arrangement.

More particularly, this invention is a compact electro-mechanical automatic transmission enclosing an electric motor package and a rotatable multi-member sun gear with members configured to fasten together.

Still more particularly, the multi-member sun gear of the foregoing automatic transmission is included with a planetary gear arrangement which nests adjacent the electric motor package and is moveable with respect to the package. One of the sun gear members is in a driving relationship with the pinion gears of the planetary gear arrangement and the other sun gear member is a shaft in driving relationship with the sun gear member. The sun gear member is axially separably connected with the sun gear shaft.

With further particularity in the foregoing compact electro-mechanical transmission, the axially separable connection of the sun gear member and the sun gear shaft is splined; and the sun gear shaft is hollow and includes a rim section where the shaft is splined, and the rim section is sufficiently axially long to support the driving relationship between the sun gear shaft and the sun gear member.

The compact electro-mechanical transmission of this invention may also include a rotatable main shaft within the hollow of the sun gear shaft. The main shaft and the sun gear shaft have respective diameters, which are not larger than required to meet their respective fatigue life requirements.

The foregoing automatic transmission includes a sun gear wherein the ring gear and sun gear have a tooth ratio of at least 2.60.

Still further, the compact electro-mechanical transmission includes a planetary arrangement which includes a ring gear that is in a drivable relationship in the planetary gear arrangement; and wherein the ring gear is chamfered to enable the planetary arrangement to be nestably compact adjacent the electric motor package.

This invention is also a method of packaging a planetary gear arrangement in an automatic transmission enclosing an electric motor package which includes: providing a rotatable multi-member sun gear with members configured to fasten together; and axially positioning the sun gear members sufficiently together so that the planetary gear arrangement is nestably adjacent the electric motor package.

Lastly, this invention includes a method of packaging the planetary gear arrangement with a ring gear in an automatic transmission enclosing an electric motor package which includes chamfering the ring gear adjacent the electric motor package so that the planetary gear arrangement is further nestably compact, adjacent the electric motor package.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
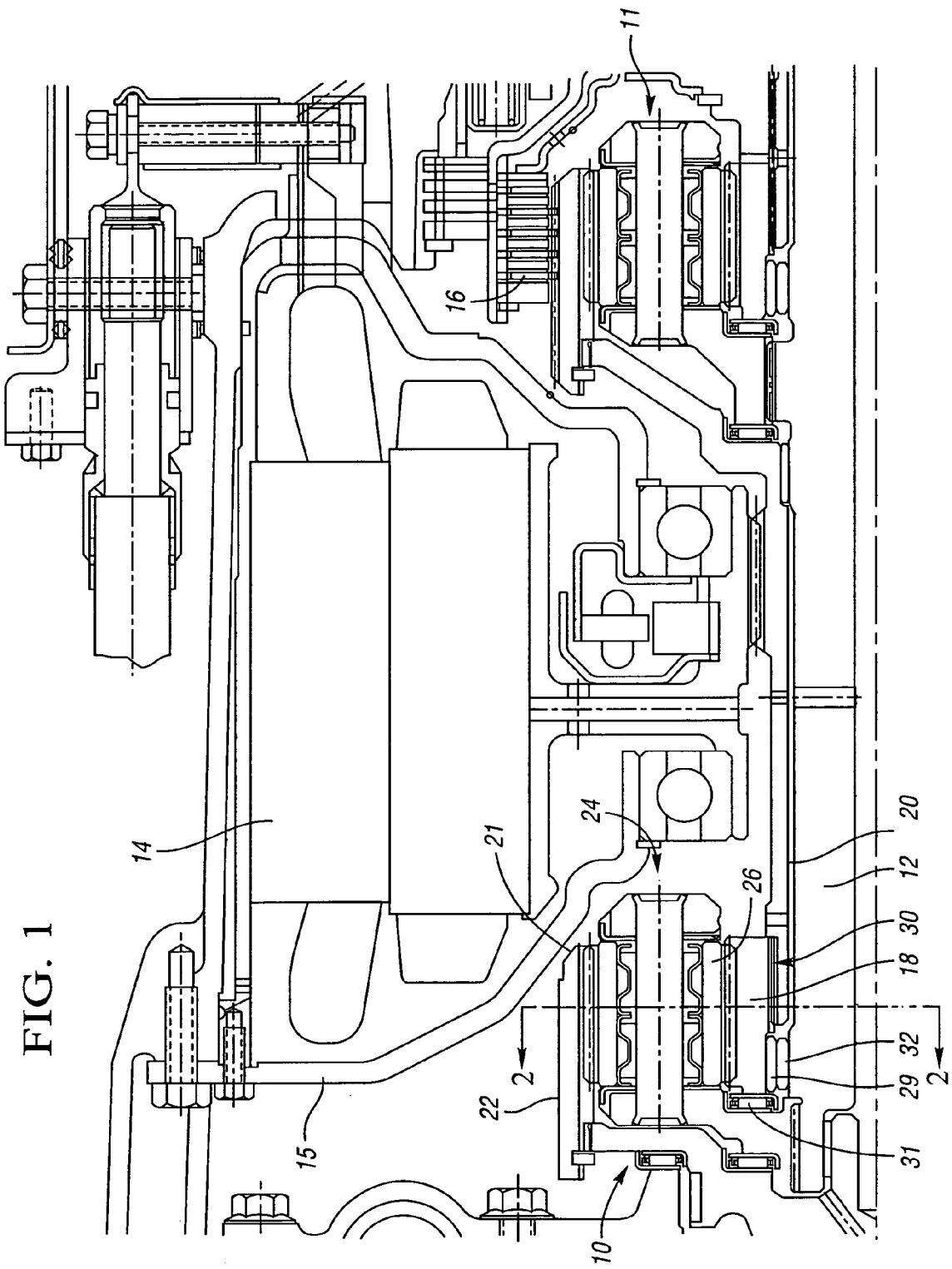
FIG. 1 is a fragmentary cross-sectional view of the invention taken along one side of the centerline of the front portion of the electro-mechanical transmission.

Referring to the drawings, FIGS. 1 through 4, wherein like characters represent the same or corresponding parts throughout the several views, there is shown in FIG. 1 a front cross-sectional view of a hybrid electro-mechanical transmission, which encloses an electric motor package 14 within a housing 15. Also included are two of the three planetary gear arrangements (10 and 11), a main shaft 12, and a clutch 16. The front planetary gear arrangement 10 is nestably adjacent to the electric motor package 14 and encircles the main shaft 12. The front planetary gear arrangement 10 includes a ring gear 22, a planetary carrier assembly 24 and a sun gear member 18 engaged with the sun gear shaft 20. Each planetary carrier assembly 24 includes a plurality of pinion gears 26, as shown better in FIG. 2, rotatably mounted to the planetary carrier assembly 24 and disposed in meshing relationship with both the sun gear member 18 and the ring gear 22.

Figure 2:
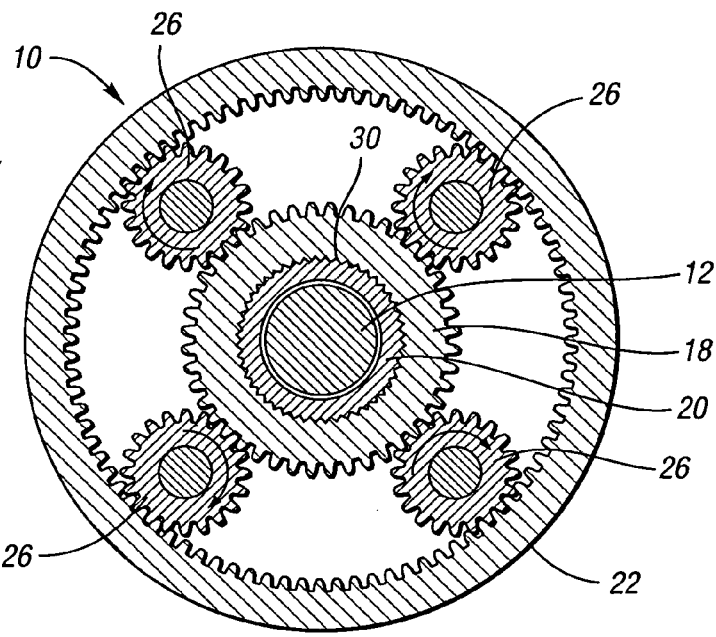
FIG. 2 is a radial cross-section taken along line 2—2 in FIG. 1 for the full transmission showing the planetary gear arrangement of this invention.
Figure 3:
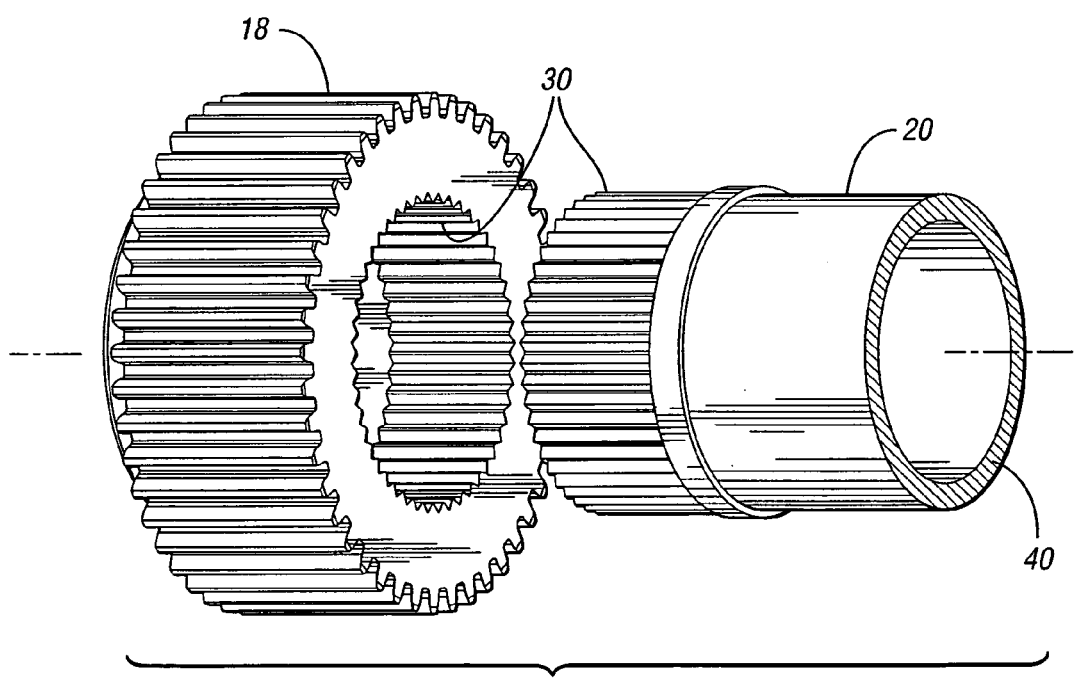
FIG. 3 is an exploded perspective view of the sun gear member and sun gear shaft portion isolated from the rest of the transmission components shown in FIGS. 1 and 2.

The sun gear member 18, as shown in FIG. 2, is in a meshing relationship with the pinion gears 26 of the planetary carrier assembly 24 and is supported by a bushing 32 and steel sleeve 29 (shown in FIG. 1) which in turn are journaled on to the main shaft 12. While the sun gear member 18 and sun gear shaft 20 are typically one integral member, the sun gear member and sun gear shaft in the preferred embodiment are axially separable. As shown in FIG. 3, the two are fastened together by compatible or complementary splining 30 on the shaft 20 of the sun gear and the sun gear member 18. The arrangement of the splines 30 should be such that the sun gear shaft 20 and sun gear member 18 are in a driving relationship so that the two rotate together.

The technical advantage of separating the sun gear member 18 and shaft 20 is in reducing the manufacturing complexity of these members. The sun gear 18 teeth (better shown in FIG. 3) see pitting and bending fatigue cycles that have a hardness requirement of Rockwell C 60 for satisfactory performance. However, the sun gear shaft 20 sees torsional loading that requires a hardness of only Rockwell C 31 for satisfactory performance. When these members are integral, the heat treatment required for the sun gear teeth causes excessive distortion of the sun gear shaft 20, as the integral part (not shown) is asymmetrical and has radially thin walls. To compensate for this distortion, straightening and re-machining the integral sun gear and sun gear shaft is required after heat treatment. High scrap rates result from this type of configuration because re-machining cannot always sufficiently compensate for any excessive distortion or cracks resulting from the straightening process. With an axially separable sun gear 18 and sun gear shaft 20 (as shown in FIG. 3), the shaft geometry can maintain its structural integrity while requiring less complicated post-heat-treatment machining processes. Thus enabling the sun gear shaft 20 to be appropriately heat-treated requiring only minor conventional machining processes after heat treatment. Thereby, the scrap rate and machining costs are minimized with the separable design.

In addition to splining, a person of ordinary skill in the art will understand that the sun gear member 18 and shaft 20 can be fastened in a variety of ways. For example, the sun gear member 18 and shaft 20 can be clamped or press-fit together; thereby still eliminating the need for post-heat-treatment machining.

The sun gear shaft 20 is again splined in a way that is complementary to the splines of the sun gear member 18, as shown in FIG. 3. The sun gear shaft 20 is splined along its rim 40. The rim 40 of the sun gear shaft 20 is adjacent to the splines 30. To conserve radial space, the rim 40 was designed to be as small as possible, while being sufficiently thick enough to support the torsional loading seen by the rim 40 when the sun gear shaft 20 and sun gear member 18 engage.

Referring to FIGS. 2 and 3, adjacent to the rim 40 is the main shaft 12. The sun gear shaft 20 is hollow and encircles the main shaft 12. The main shaft 12 is also designed with the smallest feasible diameter so as to reduce the packaging space required for the planetary gear arrangement 10. Still, the main shaft 12 was designed to meet its fatigue life requirements as well. Therefore, the appropriate diameter for the main shaft 12 is as small as possible while still meeting its fatigue life requirements.

After axial separation of the sun gear member 18 and sun gear shaft 20 the sun gear member 18 was adjusted to rest more snug with respect to the main shaft 12. Therefore the point of contact between the sun gear member 18 and the planetary pinion gears 26 changed. To compensate, the teeth of the gears were redesigned. The gear tooth ratio of the sun gear member 18 and ring gear 22 determines the overall planetary ratio, which significantly contributes to the transmission's overall gradeability performance. The ring-gear-to-sun-gear tooth ratio had to be reduced from 2.97 to 2.955 for the front and middle planetary gear arrangements and from 2.94 to 2.69 for the rear planetary gear arrangement. This ratio change, along with the aforementioned redesigns, provided the necessary radial clearance to support the spline connection between the sun gear member 18 and sun gear shaft 20.

Additionally, the ring gear 22 was modified. The ring gear 22 is in a meshing relationship with the planetary pinion gears 26. FIG. 1 shows the ring gear member 22 located nestably adjacent to the motor housing 15. The thickness of the ring gear 22 also contributes to the overall packaging requirements for the planetary gear arrangement 10. To reduce the space required by the arrangement, the ring gear 22 was chamfered at 21 along its outer diameter, as shown in FIG. 1, to enable the planetary arrangement 10 to fit compactly adjacent to the packaging or motor housing 15 of the electric motor 14 without impinging upon the motor housing 15. This was accomplished by hard turning (or machining) the ring gear until the desired dimensions were achieved. A person of ordinary skill in the art will recognize that chamfering is not the only way to reduce the radial thickness of the ring gear 22. For example, various materials could be used to increase the strength of the ring gear 22 allowing it to require a smaller diametrical dimension or thickness. Or, the axial length of the ring gear 22 may be abbreviated to avoid impingement upon the electric motor package 15.

In another aspect of the present invention, the pinion gear 26, sun gear member 18 and ring gear 22 teeth were designed to minimize their required radial packaging space. The radial tooth height and other parameters were selected to minimize their radial packaging space while meeting the material strength and noise requirements of the transmission.

Lastly, the planetary gear arrangement 10 uses helical gearing, which produces axial loading on the gears in the arrangement. Thrust bearings 31, are used to react this axial loading in the sun gear member 18. The sun gear member 18 needs sufficient radial contact length to support the thrust bearing 31 rollers that are sized according to the amount of the thrust loading expected. The gear teeth of the sun gear member 18, the splines 30 between the sun gear member 18 and shaft 20, the bushing 32 and the sleeve 29 were designed to produce the necessary radial length.

Figure 4:
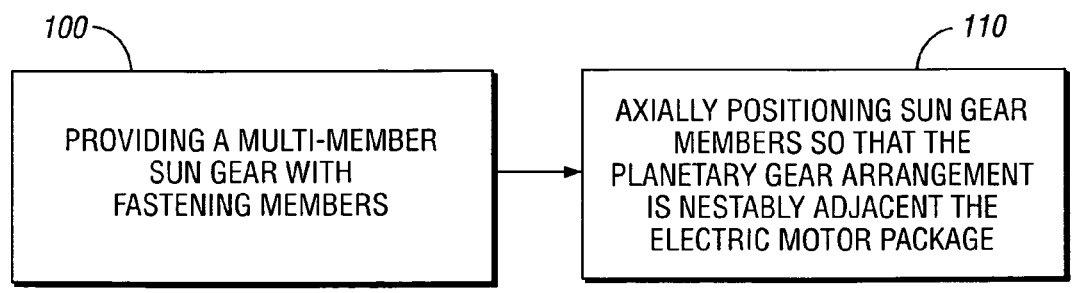
FIG. 4 is a flowchart for assembling the compact electro-mechanical transmission of this invention.

A method for assembling a compact electro-mechanical transmission is also provided and outlined in FIG. 4. The first step 100 of the method is to provide a multi-member sun gear capable of being fastened together as detailed in this disclosure. The second step 110 involves axially positioning the sun gear members so that the planetary gear arrangement is nestably adjacent to the electric motor package. A person of ordinary skill in the art will recognize that the axial positioning of the multi-member sun gear may also be contingent upon the location of other transmission components like, for example, the clutches.

While the best modes for carrying out the invention have been described in detail, those familiar with the art to which this invention relates will recognize various alternative designs and embodiments for practicing the

The invention claimed is:

1. A compact electro-mechanical automatic transmission comprising:
   a transmission housing;
   a motor package;
   a motor housing separate from said transmission housing and encapsulating said motor package, said motor housing having a recessed portion extending axially inward with respect to said motor package;
   a rotatable multi-member sun gear wherein the sun gear members are configured to fasten together; wherein said multi-member sun gear is included within a planetary gear arrangement that is positioned adjacent to said motor housing at least partially within said recessed portion.

2. The transmission of claim 1, wherein said multi-member sun gear is included with said planetary arrangement; and wherein
   one of said sun gear members is in a driving relationship with said planetary gear arrangement;
   another of said sun gear members is a sun gear shaft in a driving relationship with said one of said sun gear members; and
   said one of said sun gear members being axially separably connected with said sun gear shaft.

3. The compact electro-mechanical transmission of claim 1, wherein the axially separable connection of said one of said sun gear members and said sun gear shaft is splined; and wherein said sun gear shaft is hollow and includes a rim section where said sun gear shaft is splined, said rim section being sufficiently axially large to support the driving relationship between said one of said sun gear members and said sun gear shaft.

4. The compact electro-mechanical transmission of claim 3, including a rotatable main shaft within the hollow of said sun gear shaft, said main shaft and said sun gear shaft having respective diameters not larger than required to meet respective fatigue life requirements.

5. The automatic transmission assembly of claim 4, wherein said ring gear and said one of said sun gear members have a tooth ratio of at least 2.60.

6. The compact electro-mechanical transmission of claim 1, wherein the planetary arrangement includes a ring gear; and wherein said ring gear is in a drivable relationship in said planetary arrangement; and wherein said ring gear is chamfered to enable the planetary arrangement to fit compactly adjacent said motor housing within said recessed portion.

7. A method of packaging a planetary gear arrangement in an automatic transmission having a transmission housing and an electric motor package, comprising:
   providing a rotatable multi-member sun gear wherein the sun gear members are configured to fasten together;
   encapsulating said motor package within a motor housing separate from said transmission housing; said motor housing being formed with a tapered side profile extending axially inward with respect to said motor package;

axially positioning the sun gear members together so that the planetary gear arrangement fits compactly adjacent to said motor housing and being at least partially circumscribed by said tapered side profile.

8. The method of claim 7, wherein the planetary gear arrangement has a ring gear and further comprises:

chamfering the ring gear adjacent to said motor housing to enable said planetary gear arrangement to be positioned compactly adjacent to said tapered side profile of said motor housing.

9. A compact electro-mechanical automatic transmission enclosing an electric motor package and comprising:

a main shaft;

a transmission housing;

a motor housing separate from said transmission housing and encapsulating said motor package;

a rotatable multi-member sun gear having a sun gear shaft and a sun gear member wherein the sun gear shaft and sun gear member, are configured to fasten together;

wherein said multi-member sun gear is included with a planetary gear arrangement positioned adjacent to said motor housing and at least partially between said motor housing and said main shaft, and moveable with respect to said motor housing; wherein one of said sun gear members is in a driving relationship with said planetary gear arrangement;

another of said one of said sun gear members is a sun gear shaft in driving relationship with said one of said sun gear members; and said one of said sun gear members being axially separably connected with said sun gear shaft.

10. The transmission of claim 9, including a bushing and sleeve, wherein said multi-member sun gear is supported by said bushing and sleeve and uses helical gearing.

* * * * *